D. H. TWAITS.
GREASE CUP BASE.
APPLICATION FILED DEC. 22, 1913.
1,225,078.
Patented May 8, 1917.
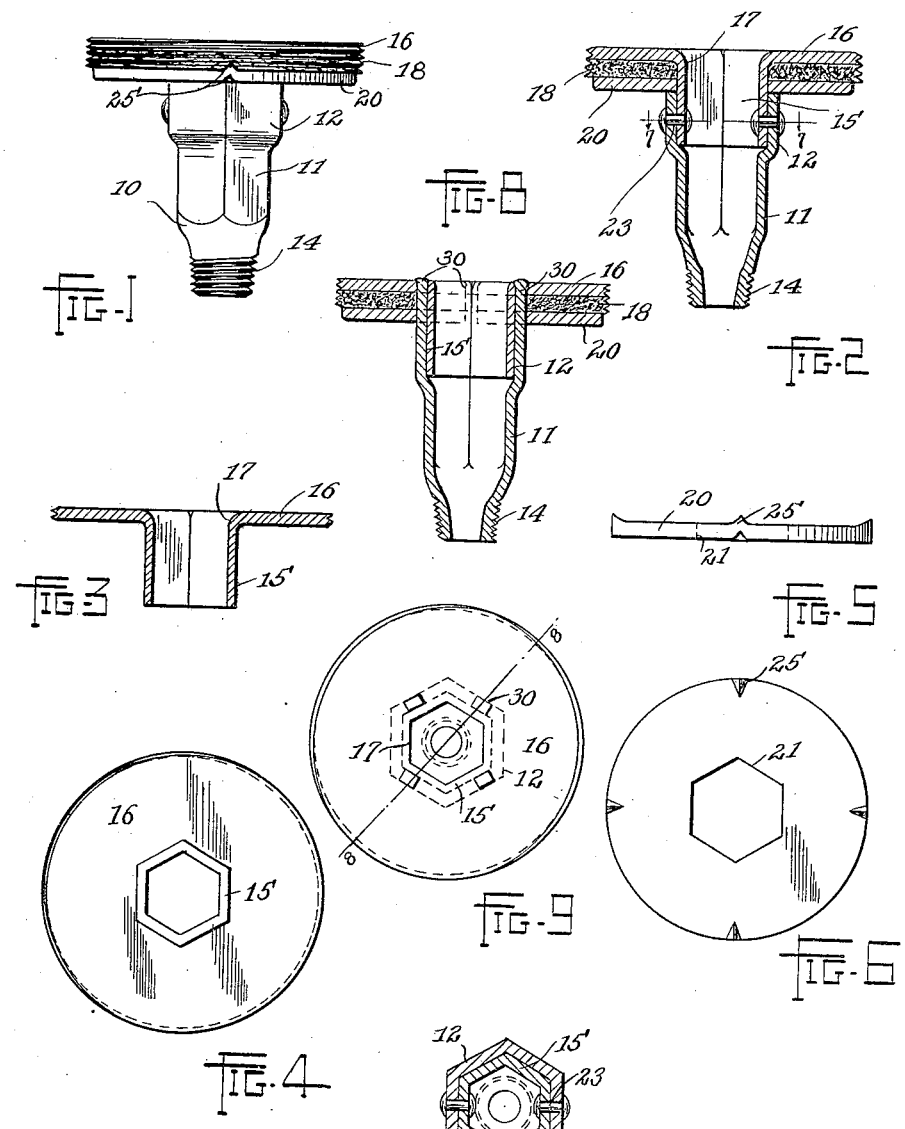

UNITED STATES PATENT OFFICE.

DANIEL H. TWAITS, OF CHICAGO, ILLINOIS.

GREASE-CUP BASE.

1,225,078.   Specification of Letters Patent.   Patented May 8, 1917.

Application filed December 22, 1913. Serial No. 808,166.

*To all whom it may concern:*

Be it known that I, DANIEL H. TWAITS, a citizen of the United States, residing at Chicago, in the county of Cook and State of Illinois, have invented a certain new and useful Improvement in Grease-Cup Bases, of which the following is a full, clear, and exact description, reference being had to the accompanying drawings.

This invention relates to grease cup bodies of a type having a stem threaded at its lower end, an intermediate angular portion and an enlarged head fitting the interior of a suitable cap. The general object is to provide a strong, durable body of this nature which shall be efficient in service and very cheaply manufactured. A further object is to provide the head with resilient portion engaging the interior of the cup to prevent the leakage of grease past the head and to provide a support on either side of said resilient portion so arranged that the head may be of simple construction.

My invention is hereinafter more fully described, and the essential characteristics set out in the claims.

Figure 1 is a side elevation of my grease cup body; Fig. 2 is a central vertical section of the same; Fig. 3 is a vertical central section of the upper disk of the head and Fig. 4 is a bottom view of the same; Fig. 5 is a side elevation of the lower disk of the head, and Fig. 6 is a plan of the same; Fig. 7 is a horizontal section taken on the line 7—7 of Fig. 2; Fig. 8 is a central vertical section of the body showing a modified construction, and Fig. 9 is a plan of the same.

The stem 10 of the body, comprises a tubular member having an angular portion 11 preferably hexagonal, which is enlarged slightly at 12 and is squared off at the upper end of the stem. Below the angular portion 11 the stem is reduced to form a nipple which is threaded as shown at 14.

The interior of the portions 11 and 12 of the stem is angular, corresponding to the angular exterior, and fitted into the portion 12, is a tubular member 15, forming a sleeve which may be drawn from the central portion of the disk 16 leaving an angular opening 17 communicating when in place, with the interior of the portion 11. Fitted around the sleeve 15 and lying against the under surface of the disk 16 is a washer 18 of leather, felt or other suitable resilient material. This washer is securely held against the disk 16 by means of a washer-like disk 20 having an angular opening 21 fitting the outside of the sleeve 15.

The outside of the sleeve 15 is preferably made a press fit in the interior of the portion 12 of the stem, thus when the parts are forced together they are rigid with one another, and being angular, one cannot turn with relation to the other and these parts may be further secured against coming apart by one or more rivets, such as indicated at 23.

In the modified form, instead of using rivets 23, I provide upwardly extending projections 30 preferably made integral with the upper end of the stem. These projections extend through the disk 16 which has suitable openings fitting over them. These openings are flared at the top allowing the metal to be upset to engage the disk while leaving a substantially smooth surface on the upper side thereof. In this form, the resilient washer 18 and the disk 20 are provided with notches in the sides of the central openings to admit these projections 30.

When the parts described are assembled, the disk 15 is prevented from moving with relation to the stem by the tightness of the fit of the sleeve into the upper portion of the stem, which at the same time prevents grease from seeping through the joint. The disk 20 resting against the shoulder provided by the upper portion of the stem, securely holds the resilient washer in place. The disk 16 may be threaded on its periphery to coöperate with the interior threads of the grease cup cap, allowing the cap to be screwed down onto the head to force grease through the sleeve and stem, to the bearing surfaces. The resilient washer is preferably made slightly larger than the periphery of the disk 16 so that when screwed into place it will conform to the threads of the cap, making a tight joint therewith. The disk 20 is preferably of smaller diameter than the disk 16 to allow its periphery to clear the top of the threads in the cap, and this disk may be provided with humps 25 pressed upwardly at its periphery to engage the resilient washer and cause it to turn with the head. In the modified form, the parts are very securely held together by means of the projections 30 which not only act to prevent the parts becoming separated, but also engage each of the parts to prevent any of them turning with relation to the others.

It will be seen from the foregoing description that the sleeve 15 may be readily formed by drawing out the central portion of the disk 16, and the disk 20 may be readily formed by stamping, while the stem may be formed from a piece of plain tubing, by forming the angular portions and drawing out the end of the tube to form the stem for the threads 14. In the modified form, the projections 30 may conveniently be made by shearing away the intervening portions of the stem. Thus the grease cup body may be largely made by pressing and stamping operations which are comparatively cheap, and at the same time the body so formed is very durable and of simple construction.

Having thus described my invention, what I claim is:

1. A grease cup body comprising a stem having an angular tubular upper portion and a threaded lower portion, and a head having an angular tubular portion extending from the side thereof, the angular tubular portion of one member embracing the angular tubular portion of the other.

2. A grease cup body comprising a stem having a threaded lower end, an internal passageway, an angular portion at its upper end, a head comprising a disk having an angular sleeve extending from the side thereof and engaging the angular portion of the head, and projections on the stem extending through the disk and having their ends upset to engage the same.

3. A grease cup body comprising a stem having a threaded lower end, an internal passageway, an angular portion at its upper end; a head comprising a disk having an angular sleeve extending from the side thereof and engaging the angular portion of the stem, and means for positively securing the head to the stem.

4. In a grease cup body, the combination of a stem having an angular tubular end, a disk having an angular tubular sleeve extending from the side thereof and pressed into said tubular end, and a resilient washer surrounding said sleeve and resting against said washer, and a second disk resting against said resilient washer and abutting the upper end of the stem.

5. In a grease cup body, the combination of a hollow stem having a threaded lower end and an angular portion at its upper end, a disk having an angular sleeve pressed from the side thereof and fitted into the upper end of said stem, a washer of resilient material surrounding said sleeve and fitted against said disk, and a second disk having an angular opening surrounding said sleeve, said second disk resting against said washer and abutting the upper end of the stem.

6. In a grease cup body, the combination of a tubular stem having a threaded lower end and an angular upper end, a disk having a threaded exterior and an angular sleeve extending from the side thereof forming an opening through the disk said sleeve engaging the interior of the angular portion of the stem, a resilient washer surrounding said sleeve resting against the under side of said disk, and a second disk of slightly smaller diameter than the first mentioned disk having an angular central opening embracing said sleeve, said second disk resting when in position against the upper end of the stem and having means engaging the resilient washer to prevent the same turning with relation to the other disk and stem.

7. In a grease cup, the combination of a tubular stem having a plurality of projections extending from the upper end thereof, and a head having a central opening, said projections extending through said head by being upset to hold the head in place.

8. In a grease cup body, the combination of a stem having a threaded lower end, a hollow interior, a series of projections extending from the upper end, a head having a central opening and cut away portions adjacent said opening in which said projections extend when the head is in place on the stem.

9. In a grease cup, the combination of a stem having a tubular portion, a head having a tubular portion rigid therewith one of said tubular portions fitting into the other, and projections on the stem engaging the head.

10. A grease cup body comprising a stem having an angular tubular portion, a head having an angular tubular portion rigid therewith and extending from the side thereof, one of said tubular portions being fitted tightly into the other, and projections on one of said members extending into the other.

11. A grease cup body comprising a stem having an angular upper portion, projections extending therefrom and a threaded lower portion, and a head having an angular portion extending from the side thereof and engaging the angular end of the stem, said projections extending through said head and being upset on the upper side thereof.

12. A grease cup body comprising a stem having a tubular end, a disk having a tubular portion extending from the side thereof and engaging the portion of the stem, a washer of resilient material beneath said disk, a second disk beneath said washer, and projections on the stem extending through said disks and washer.

13. In a grease cup body, the combination of a stem having a tubular end, a disk having a tubular sleeve extending from the side thereof and pressed into said tubular end, a resilient washer surrounding said sleeve and resting against said washer said second disk abutting the upper end of the stem, and projections on the stem extending through said disks and washer and upset to engage the first mentioned disk.

14. A grease cup body comprising a head and a tubular member depending therefrom, a circular resilient member of the same diameter as the head and lying beneath the same, a disk-like member surrounding the sleeve and lying against said resilient member to hold the same in position, and a second sleeve member extending over the first sleeve member and engaging said disk-like member.

15. In a grease cup body, the combination of a head, a stem extending downwardly therefrom, a resilient member underneath the head being circular and substantially the same diameter as the head, and a disk-like member resting against the resilient member and acting to hold the same in position, said stem having a shoulder on the stem engaging beneath the disk-like member to hold it in position.

16. In a grease cup body, the combination of a head, a stem extending downwardly therefrom and having a non-circular exterior adjacent the head, a resilient washer underneath the head, and a disk-like member resting against the resilient washer and holding the same in position, said stem having a shoulder engaging the disk-like member and serving to hold the same in position.

In testimony whereof, I hereunto affix my signature in the presence of two witnesses.

DANIEL H. TWAITS.

Witnesses:
H. L. HALL,
W. G. MORFORD.

Copies of this patent may be obtained for five cents each, by addressing the "Commissioner of Patents, Washington, D. C."